United States Patent
Miyata et al.

(10) Patent No.: US 12,087,536 B2
(45) Date of Patent: Sep. 10, 2024

(54) MULTI-LINK FUSE AND METHOD FOR MANUFACTURING MULTI-LINK FUSE

(71) Applicant: Pacific Engineering Corporation, Gifu (JP)

(72) Inventors: Yoshinobu Miyata, Gifu (JP); Jyunhyoku Yang, Gifu (JP)

(73) Assignee: Pacific Engineering Corporation, Gifu (JP)

( * ) Notice: Subject to any disclaimer, the term of this patent is extended or adjusted under 35 U.S.C. 154(b) by 161 days.

(21) Appl. No.: 17/793,139

(22) PCT Filed: Feb. 18, 2021

(86) PCT No.: PCT/JP2021/006059
§ 371 (c)(1),
(2) Date: Jul. 15, 2022

(87) PCT Pub. No.: WO2021/182054
PCT Pub. Date: Sep. 16, 2021

(65) Prior Publication Data
US 2023/0047348 A1    Feb. 16, 2023

(30) Foreign Application Priority Data

Mar. 9, 2020  (JP) .................................. 2020-039540

(51) Int. Cl.
*H01H 85/143*    (2006.01)
*H01H 69/02*    (2006.01)
(Continued)

(52) U.S. Cl.
CPC ............ *H01H 85/12* (2013.01); *H01H 69/02* (2013.01); *H01H 85/143* (2013.01);
(Continued)

(58) Field of Classification Search
CPC .......... H01H 2085/0555; H01H 85/12; H01H 69/02; H01H 85/143; H01H 85/1755;
(Continued)

(56) References Cited

U.S. PATENT DOCUMENTS

| | | | |
|---|---|---|---|
| 2009/0023334 A1* | 1/2009 | Puschkat ............ | H01H 85/2045 439/590 |
| 2010/0019572 A1* | 1/2010 | Kudo ................... | H01H 85/044 307/10.7 |

(Continued)

FOREIGN PATENT DOCUMENTS

| | | |
|---|---|---|
| JP | 2009-252453 | 10/2009 |
| JP | 2018-026967 | 2/2018 |
| JP | 2019-036509 | 3/2019 |

OTHER PUBLICATIONS

International Search Report (+ English translation) and Written Opinion of the International Searching Authority dated Apr. 27, 2021, in International Patent Application No. PCT/JP21/06059, 8 pages.

*Primary Examiner* — Jacob R Crum
(74) *Attorney, Agent, or Firm* — Lowe Graham Jones PLLC

(57) ABSTRACT

The present invention provides a multi-link fuse capable of charging a battery with a configuration simpler than a conventional configuration, and a method for charging a battery by using the multi-link fuse. A multi-link fuse H includes a bus bar body that includes an input terminal, a plurality of external terminals, and a fusion portion provided between the input terminal and the external terminal, and a housing body that covers the bus bar body. The multi-link fuse H includes an extension bus bar for charging a battery by connecting a charging connection terminal. The extension bus bar includes an input extension terminal that overlaps the input terminal and an outer extension portion (Continued)

that extends outward from the bus bar body and connects the charging connection terminal. Both the extension bus bar and the bus bar body are fixed to the housing body in a state where the input extension terminal of the extension bus bar overlaps the input terminal.

5 Claims, 8 Drawing Sheets

(51) Int. Cl.
*H01H 85/12* (2006.01)
*H01H 85/175* (2006.01)
*H01M 10/44* (2006.01)
*H01M 50/583* (2021.01)

(52) U.S. Cl.
CPC ........ *H01H 85/1755* (2013.01); *H01M 10/44* (2013.01); *H01M 50/583* (2021.01); *H01M 2200/103* (2013.01); *H01M 2220/20* (2013.01)

(58) Field of Classification Search
CPC ........... H01H 2085/2075; H01H 85/10; H01H 85/175; H01H 85/05; H01M 10/44; H01M 50/583; H01M 2200/103; H01M 2220/20; H01M 50/572; Y02E 60/10
See application file for complete search history.

(56) References Cited

U.S. PATENT DOCUMENTS

| | | | |
|---|---|---|---|
| 2013/0126204 A1* | 5/2013 | Nohara | H02G 5/025 174/50 |
| 2015/0155125 A1* | 6/2015 | Nohara | H01H 85/12 337/290 |
| 2019/0067964 A1* | 2/2019 | Kawase | H02B 1/20 |
| 2021/0066895 A1* | 3/2021 | Shiraki | H01R 13/68 |

\* cited by examiner

MULTI-LINK FUSE AND METHOD FOR MANUFACTURING MULTI-LINK FUSE

PRIORITY CLAIM

This application is a U.S. national phase of International Patent Application No. PCT/JP2021/006059 filed Feb. 18, 2021; which claims the benefit of priority from Japan Patent Application No. 2020-039540, filed Mar. 9, 2020, the contents of which are incorporated by reference.

FIELD OF THE INVENTION

The present invention relates to a fuse mainly used for an automobile electric circuit or the like, and more particularly to a multi-link fuse including a plurality of external terminals and a method for manufacturing the multi-link fuse.

BACKGROUND OF THE INVENTION

Conventionally, fuses have been used to protect an electric circuit mounted on an automobile or the like and various electrical components connected to the electric circuit. Specifically, in a case where an unintended overcurrent flows in the electric circuit, a fusion portion fuses due to heat generated by the overcurrent, and thus various electric components are protected so that an excessive current does not flow in the various electric components.

There are various types of fuses depending on the application. For example, the multi-link fuse in Patent Literature 1 connects an in-vehicle battery and an electric wire for supplying power to various electrical components. Such a multi-link fuse includes a plurality of external terminals connected to the various electrical components, and a fusion portion is interposed between the external terminals and the in-vehicle battery, thereby protecting the various electrical components so that the excessive current does not flow in the various electric components.

Further, in the multi-link fuse in Patent Literature 1, an opening for exposing an internal bus bar is formed in a portion of a housing. Thus, it is possible to charge the battery by connecting a charging connection terminal to the bus bar from the opening. However, since the opening is formed by cutting out the portion of the housing, a range where the bus bar is exposed is relatively narrow. In addition, for example, in a case where the charging connection terminal is relatively large, and in a case where the shape of the connection terminal is unique, it is difficult to attach the charging connection terminal.

CITATIONS LIST

Patent Literature

Patent Literature 1: Japanese Patent Application Laid-Open No. 2019-36509

SUMMARY OF THE INVENTION

Technical Problems

Therefore, considering the above problems, the present invention provides a multi-link fuse to which a charging connection terminal is easily attached, and a method for manufacturing the multi-link fuse.

Solutions to Problems

According to the present invention, a multi-link fuse includes a bus bar body including an input terminal, a plurality of external terminals, and a fusion portion provided between the input terminal and the external terminal, a housing body that covers the bus bar body, and an extension bus bar for charging a battery by being connected to a charging connection terminal. The extension bus bar includes an input extension terminal that overlaps the input terminal, and an outer extension portion that extends outward from the bus bar body and is connected to the charging connection terminal. Both the extension bus bar and the bus bar body are fixed to the housing body in a state where the input extension terminal of the extension bus bar is overlapped with the input terminal.

According to the above characteristics, the outer extension portion of the extension bus bar, which connects the charging connection terminal, extends outward from the bus bar body. Thus, the charging connection terminal can be easily attached to the outer extension portion. In addition, since the extension bus bar and the bus bar body are integrally fixed to the housing body so as not to be separated from each other in a state where the input extension terminal of the extension bus bar overlaps the input terminal of the bus bar body, electrical connection accuracy between the input terminal and the extension bus bar is high, and the battery is effectively charged. Further, since the input extension terminal of the extension bus bar is fixed to the housing body in a state of being overlapped with the input terminal of the bus bar body, it is possible to continuously assemble the extension bus bar in the same manufacturing line of the multi-link fuse, and the production efficiency is fair.

According to the present invention, the multi-link fuse further includes an expansion housing that covers the outer extension portion of the extension bus bar. The expansion housing includes an exposure window for exposing a portion of the outer extension portion, and is fixed to the housing body.

According to the above characteristics, the outer extension portion of the extension bus bar that extends outward from the bus bar body is covered and protected by the expansion housing, and further, the expansion housing includes an exposure window for exposing a portion of the outer extension portion. Thus, it is possible to easily connect the charging connection terminal to the outer extension portion.

According to the present invention, the multi-link fuse further includes a cover portion that opens and closes the exposure window of the expansion housing.

According to the above characteristics, it is possible to protect the outer extension portion from being carelessly touched by a person or the like.

According to the present invention, there is provided a method for manufacturing a multi-link fuse including a bus bar body and a housing body, the bus bar body including an input terminal, a plurality of external terminals, and a fusion portion provided between the input terminal and the external terminal, and the housing body covering the bus bar body. An extension bus bar for charging a battery by connecting a charging connection terminal is provided. The method includes fixing the extension bus bar to the housing body together with the bus bar body in a state where an input extension terminal is overlapped with the input terminal while an outer extension portion that connects the charging connection terminal protrudes outward from the bus bar body.

According to the above characteristics, since the input extension terminal of the extension bus bar has a form of being fixed to the housing body in a state of being overlapped with the input terminal of the bus bar body, it is possible to continuously assemble the extension bus bar in the same manufacturing line of the multi-link fuse, and the production efficiency is fair. Further, since the outer extension portion of the extension bus bar connecting the charging connection terminal extends outward from the bus bar body, the charging connection terminal can be easily attached to the outer extension portion. In addition, since the extension bus bar and the bus bar body are integrally fixed to the housing body so as not to be separated from each other in a state where the input extension terminal of the extension bus bar overlaps the input terminal of the bus bar body, electrical connection accuracy between the input terminal and the extension bus bar is high, and the battery is effectively charged.

According to the present invention, the method for manufacturing a multi-link fuse further includes fixing an expansion housing to the housing body, the expansion housing covering the outer extension portion of the extension bus bar and including an exposure window for exposing a portion of the outer extension portion.

According to the above characteristics, since the expansion housing is fixed to the housing body, it is possible to continuously assemble the expansion housing in the same manufacturing line of the multi-link fuse, and the production efficiency is fair. In addition, the outer extension portion of the extension bus bar that extends outward from the bus bar body is covered and protected by the expansion housing, and further, the expansion housing includes an exposure window for exposing a portion of the outer extension portion. Thus, it is possible to easily connect the charging connection terminal to the outer extension portion.

Advantageous Effects of Invention

As described above, according to the multi-link fuse of the present invention and the method for manufacturing the multi-link fuse, it is easy to attach the charging connection terminal.

BRIEF DESCRIPTION OF THE DRAWINGS

Preferred and alternative examples of the present invention are described in detail below with reference to the following drawings.

Figure 1A:
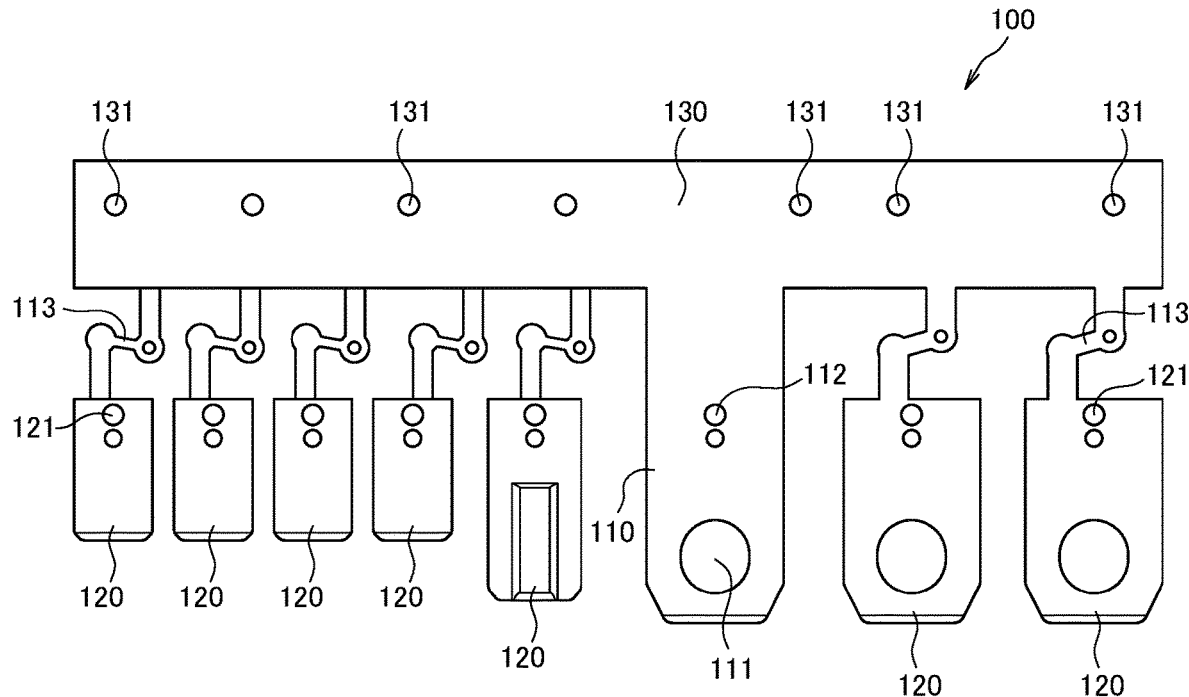
FIG. 1(a) is a front view of a bus bar body of a multi-link fuse according to the present invention.

REFERENCE SIGNS LIST 100 bus bar body
110 input terminal
113 fusion portion
120 external terminal
400 housing body
500 extension bus bar
510 input extension terminal
520 outer extension portion
H multi-link fuse

DETAILED DESCRIPTION OF THE PREFERRED EMBODIMENT

Hereinafter, an embodiment of the present invention will be described with reference to the drawings. Note that the shape, material, and the like of each member of a multi-link fuse in the embodiment described below are merely examples, and the present invention is not limited thereto.

Figure 1B:
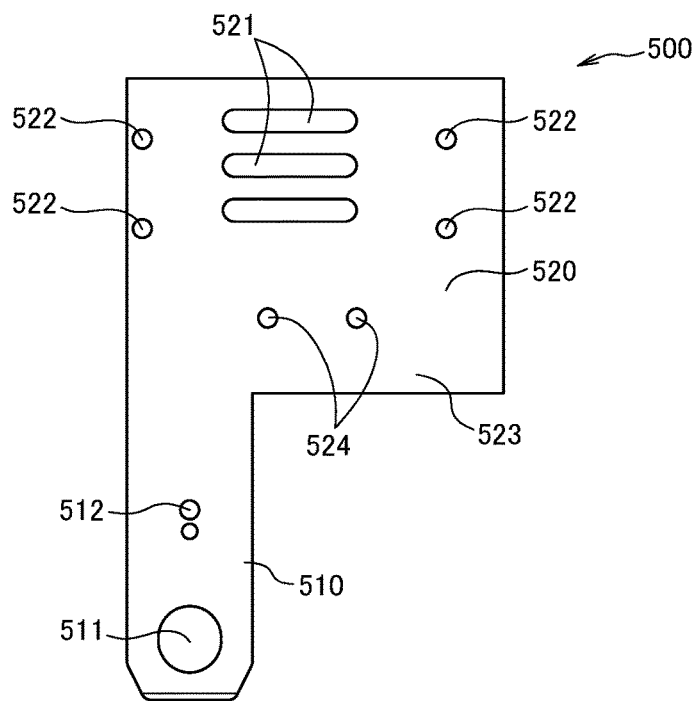
FIG. 1(b) is a front view of an extension bus bar.

FIG. 1 illustrates a bus bar body 100 and an extension bus bar 500 of a multi-link fuse according to the present invention. Note that FIG. 1(a) is a front view of the bus bar body 100, and FIG. 1(b) is a front view of the extension bus bar 500.

As illustrated in FIG. 1(a), the bus bar body 100 includes an input terminal 110, a plurality of external terminals 120, and a circuit portion 130. The input terminal 110 is formed by punching a flat plate-shaped member, that is made of conductive metal such as copper or an alloy thereof and has a uniform thickness, into a predetermined shape with a pressing machine or the like and is enabled to be energized with a battery or the like. The input terminal 110 is coupled to the circuit portion 130, and the external terminal 120 is coupled to the circuit portion 130 via a fusion portion 113. Therefore, when an overcurrent flows from a power source side such as a battery connected to the input terminal 110, the fusion portion 113 fuses, and thus it is possible to protect loads such as various electrical components coupled to the external terminals 120.

Note that the input terminal 110 is provided with a coupling hole 111 through which a terminal connected to the battery or the like is inserted and fixed. In addition, the input terminal 110 is provided with a through hole 112 through which a coupling protrusion of a housing described later passes. Similarly, the external terminal 120 is also provided with a through hole 121 through which the coupling protrusion of the housing passes, and the circuit portion 130 is also provided with a through hole 131 through which the coupling protrusion of the housing passes. Further, the circuit portion 130 which is a portion connecting the input terminal 110 and the external terminal 120 is not limited to a substantially rectangular shape as illustrated in FIG. 1(a), and may be set to have any shape in accordance with the specification.

Next, as illustrated in FIG. 1(b), the extension bus bar 500 includes an input extension terminal 510 and a substantially square outer extension portion 520. The input extension terminal 510 is formed by punching a flat plate-shaped member, that is made of conductive metal such as copper or an alloy thereof and has a uniform thickness, into a predetermined shape with a pressing machine or the like. The input extension terminal 510 is allowed to be energized with the battery or the like. As will be described later, the input extension terminal 510 is configured to be overlapped with and in close contact with the input terminal 110 of the bus bar body 100 so as to be allowed to be energized with the input terminal 110. In addition, the input extension terminal 510 is provided with a coupling hole 511 through which a terminal connected to the battery or the like is inserted and fixed, and a through hole 512 through which the coupling protrusion of the housing described later passes. As will be described later, the coupling hole 511 and the through hole 512 are configured such that, when the input extension terminal 510 overlaps the input terminal 110 of the bus bar body 100, the coupling hole 511 overlaps the coupling hole 111 of the input terminal 110, and the through hole 512 overlaps the through hole 112 of the input terminal 110.

Further, as will be described later, the outer extension portion 520 is configured to extend outward from the circuit portion 130 of the bus bar body 100, and a clip-like charging connection terminal can be attached to the outer extension portion 520. In addition, through holes 522 through which coupling protrusions of an expansion housing described later pass are provided on both sides of the outer extension portion 520. Further, the lower end 523 side of the outer extension portion 520 serves as a portion that is overlapped with and in close contact with the circuit portion 130 of the bus bar body 100, and is provided with a through hole 524 through which the coupling protrusion of the housing passes. The through hole 524 is configured to overlap the through hole 131 of the bus bar body 100. An anti-slip projection 521 is provided on the front surface of the outer extension portion 520 so that the charging connection terminal is not carelessly detached. In addition, the outer extension portion 520 has a flat shape so as to easily attach the clip-like charging connection terminal, but the shape of the outer extension portion 520 is not limited thereto. For example, the outer extension portion 520 may be set to have any shape, for example, may be provided with a coupling hole for insertion and fixation of the charging connection terminal.

Figure 2A:
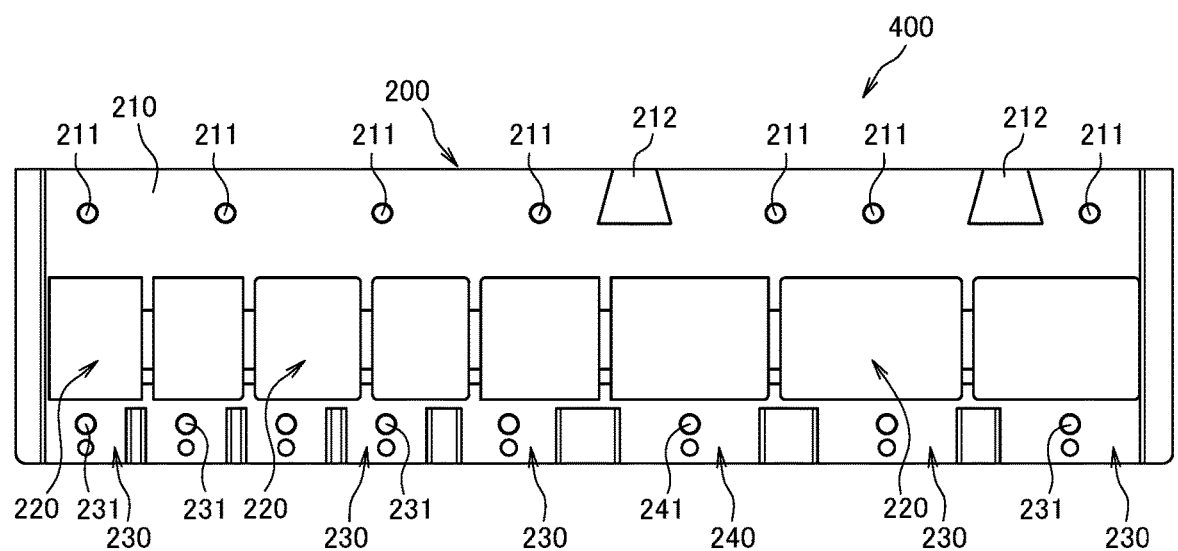
FIG. 2(a) is a front view of one housing divided piece of a housing body of the multi-link fuse in the present invention.
Figure 2B:
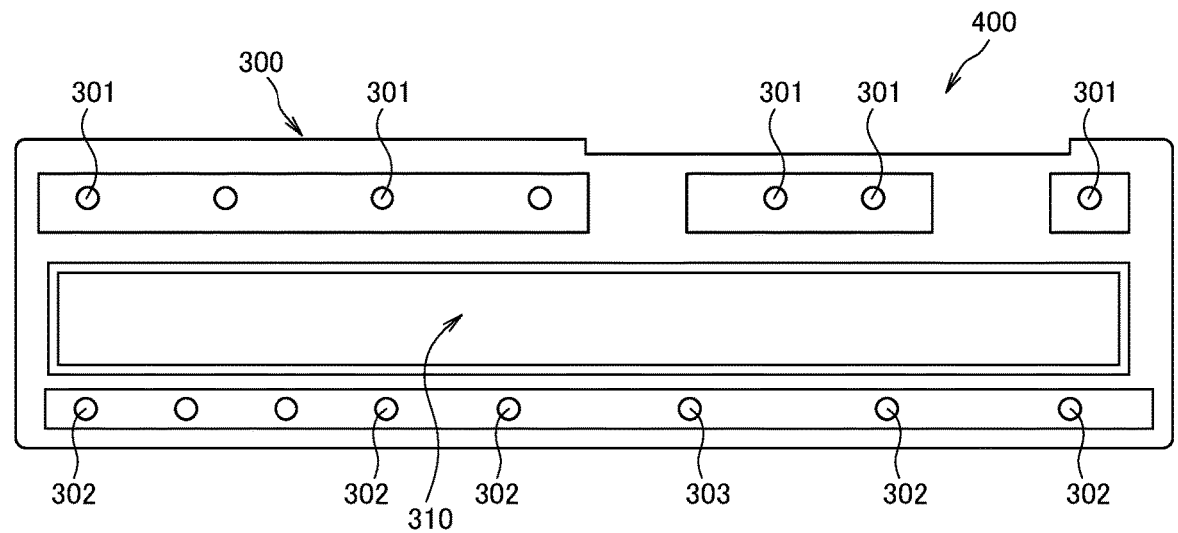
FIG. 2(b) is a front view of the other housing divided piece.

Next, the housing body 400 of the multi-link fuse according to the present invention will be described with reference to FIG. 2. Note that the housing body 400 is configured by a pair of housing divided pieces 200 and 300. FIG. 2(*a*) is a front view illustrating the inner side of one housing divided piece 200, and FIG. 2(*b*) is a front view illustrating the outer side of the other housing divided piece 300.

As illustrated in FIG. 2(*a*), the housing divided piece 200 is made of synthetic resin and has a substantially rectangular shape. The housing divided piece 200 includes an upper end side accommodation portion 210 that accommodates the circuit portion 130 of the bus bar body 100, a central side accommodation portion 220 that accommodates the fusion portion 113 of the bus bar body 100, a lower end side accommodation portion 230 that accommodates the upper end side (the side coupled to the fusion portion 113) of the external terminal 120 of the bus bar body 100, and an input terminal accommodation portion 240 that accommodates the vicinity of the center of the input terminal 110 of the bus bar body 100. In the upper end side accommodation portion 210, a plurality of coupling protrusions 211 that pass through the through holes 131 of the circuit portion 130 of the bus bar body 100 are formed. Further, the upper end side accommodation portion 210 is provided with a fitting hole 212 to be fitted with a portion of the expansion housing described later. In addition, in the lower end side accommodation portion 230, a coupling protrusion 231 that passes through the through hole 121 of the external terminal 120 of the bus bar body 100 is formed. Similarly, in the input terminal accommodation portion 240, a coupling protrusion 241 that passes through the through hole 112 of the input terminal 110 of the bus bar body 100 is formed.

Next, as illustrated in FIG. 2(*b*), the housing divided piece 300 is made of synthetic resin and has a substantially rectangular shape, and has a shape corresponding to the housing divided piece 200 so that the bus bar body 100 accommodated in the housing divided piece 200 can be sandwiched and covered. Further, the housing divided piece 300 includes an insertion hole 301 through which the coupling protrusion 211 of the upper end side accommodation portion 210 of the housing divided piece 200 can be inserted, an insertion hole 302 through which the coupling protrusion 231 of the lower end side accommodation portion 230 of the housing divided piece 200 can be inserted, and an insertion hole 303 through which the coupling protrusion 241 of the input terminal accommodation portion 240 of the housing divided piece 200 can be inserted. In addition, the housing divided piece 300 is provided with a viewing window 310 made of transparent resin so that the fusion portion 113 of the bus bar body 100 accommodated in the housing body 400 can be viewed from the outside.

Figure 3A:
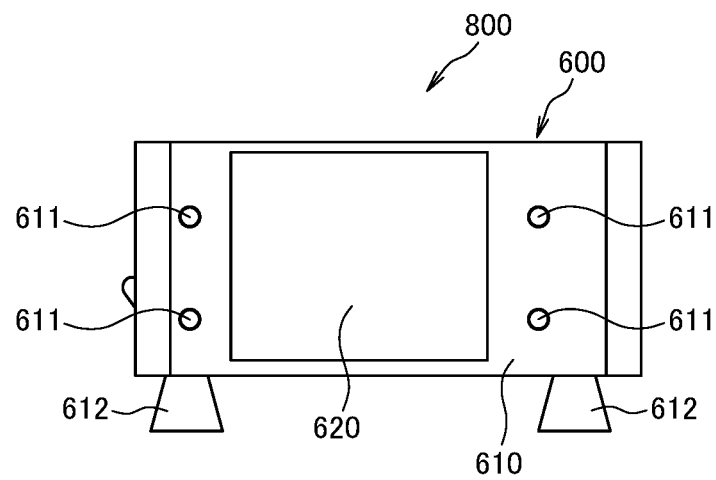
FIG. 3(a) is a front view of one expansion-housing divided piece of an expansion housing of the multi-link fuse in the present invention.
Figure 3B:
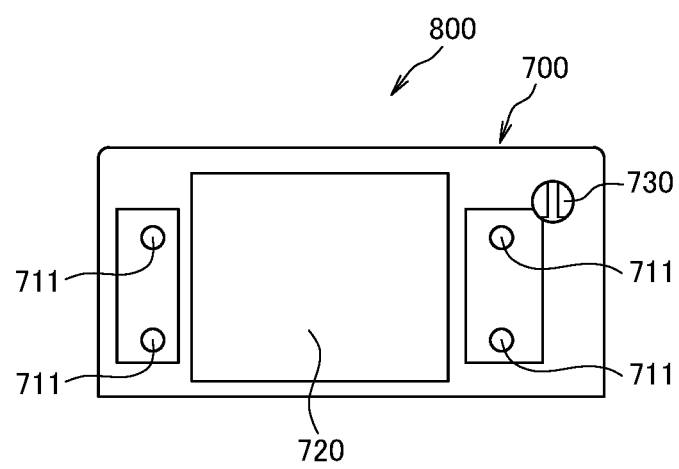
FIG. 3(b) is a front view of the other expansion-housing divided piece.

Next, the expansion housing 800 of the multi-link fuse according to the present invention will be described with reference to FIG. 3. The expansion housing 800 includes a pair of expansion-housing divided pieces 600 and 700. FIG. 3(*a*) is a front view illustrating the inner side of one expansion-housing divided piece 600, and FIG. 3(*b*) is a front view illustrating the outer side of the other expansion-housing divided piece 700.

As illustrated in FIG. 3(*a*), the expansion-housing divided piece 600 is made of synthetic resin and has a substantially rectangular shape. The expansion-housing divided piece 600 includes an accommodation portion 610 that accommodates the outer extension portion 520 of the extension bus bar 500. In addition, the accommodation portion 610 includes an exposure window 620 penetrating from the front surface to the back surface in order to expose a portion of the outer extension portion 520 accommodated in the accommodation portion 610 to the outside. Further, a plurality of coupling protrusions 611 that pass through the through holes 522 of the outer extension portion 520 of the extension bus bar 500 are formed on both sides of the accommodation portion 610. Further, a fitting protrusion 612 which has a shape corresponding to the fitting hole 212 of the housing divided piece 200 and is fitted to the fitting hole 212 is provided on the lower end side of the expansion-housing divided piece 600.

Next, as illustrated in FIG. 3(*b*), the expansion-housing divided piece 700 is made of synthetic resin and has a substantially rectangular shape. The expansion-housing divided piece 700 has a shape corresponding to the expansion-housing divided piece 600 so as to sandwich and cover the outer extension portion 520 of the extension bus bar 500 accommodated in the expansion-housing divided piece 600. In addition, the expansion-housing divided piece 700 includes an exposure window 720 penetrating from the front surface to the back surface in order to expose a portion of the outer extension portion 520 accommodated in the expansion housing 800 to the outside.

Further, a plurality of insertion holes 711 through which the coupling protrusions 611 of the expansion-housing divided piece 600 are inserted are provided at positions corresponding to the coupling protrusions 611 on both sides of the expansion-housing divided piece 700. The exposure window 620 of the expansion-housing divided piece 600 and the exposure window 720 of the expansion-housing divided piece 700 are disposed so as to overlap each other in a front-rear direction. Therefore, when the outer extension portion 520 of the extension bus bar 500 is sandwiched and accommodated by the expansion-housing divided pieces 600 and 700, the back surface side of the outer extension portion 520 is exposed from the exposure window 620 of the expansion-housing divided piece 600, and the front surface side of the outer extension portion 520 is exposed from the exposure window 720 of the expansion-housing divided piece 700. Thus, it is possible to easily attach the clip-like charging connection terminal so as to be sandwiched from both sides of the exposed front and back surfaces of the outer extension portion 520. Note that a portion of the expansion-housing divided piece 700 is provided with a pivot shaft 730 that pivotally supports the cover portion described later.

Next, a method for manufacturing the multi-link fuse H according to the present invention will be described with reference to FIGS. 4 to 8. FIGS. 4 to 8 are overall perspective views illustrating a manufacturing process of the multi-link fuse H in the present invention. In the manufacturing process of the multi-link fuse H illustrated in FIGS. 4 to 8, the multi-link fuse H is assembled by an operator in the same manufacturing line or automatically assembled by an assembling device in the same manufacturing line.

Figure 4:
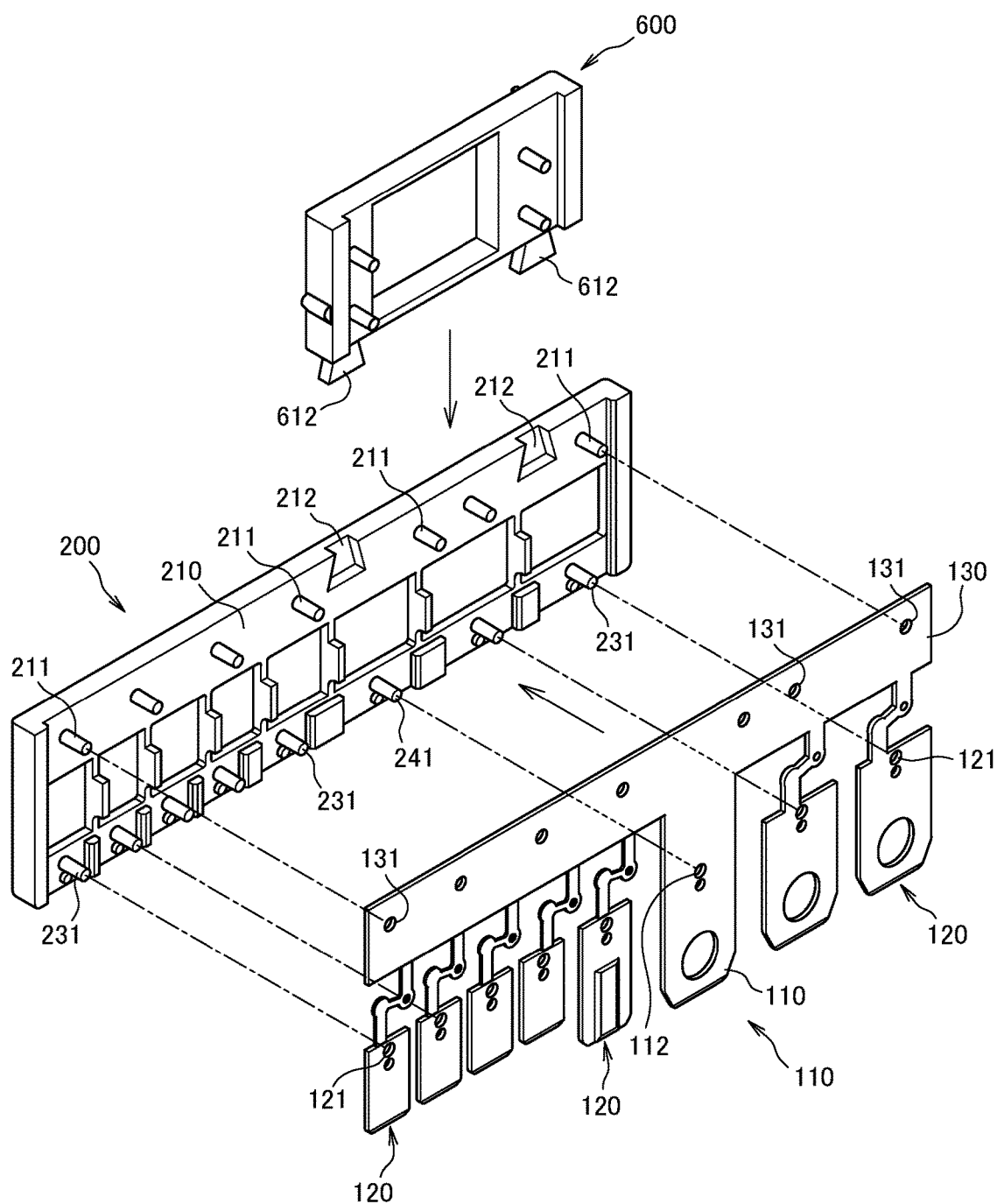
FIG. 4 is an overall perspective view illustrating a process of manufacturing the multi-link fuse in the present invention.
Figure 5:
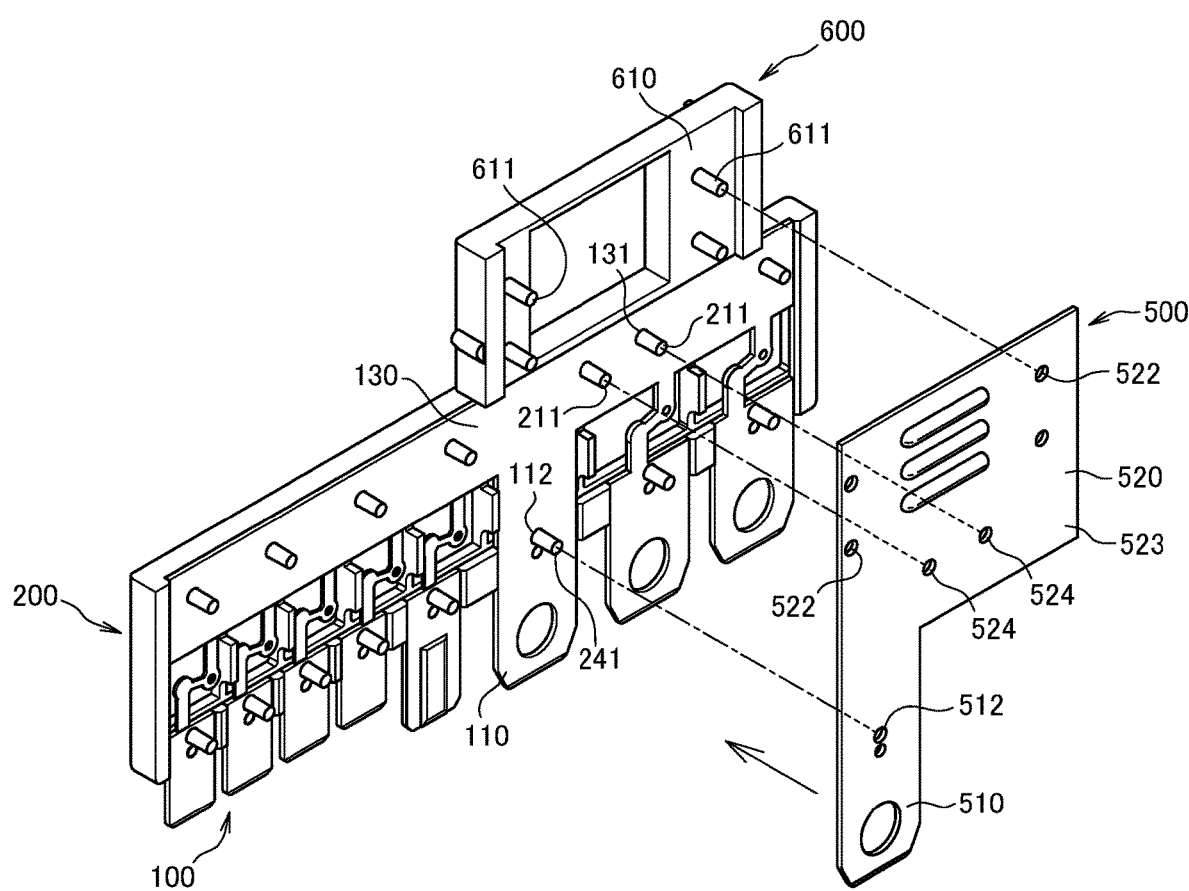
FIG. 5 is an overall perspective view illustrating the process of manufacturing the multi-link fuse in the present invention.

First, as illustrated in FIGS. 4 and 5, the bus bar body 100 is accommodated in the housing divided piece 200, and the expansion-housing divided piece 600 is fixed to the housing divided piece 200. Specifically, as illustrated in FIG. 4, the expansion-housing divided piece 600 is attached to the upper end side of the housing divided piece 200, and the fitting protrusion 612 of the expansion-housing divided piece 600 is fitted to the fitting hole 212 of the housing divided piece 200. In this manner, the expansion-housing divided piece 600 is coupled and fixed to the housing divided piece 200 as illustrated in FIG. 5. Since the fitting protrusion 612 has a substantially trapezoidal shape, the expansion-housing divided piece 600 coupled to the fitting hole 212 is fixed so as not to come off upward. Further, as illustrated in FIG. 4, the coupling protrusions 211 of the housing divided piece 200 are inserted into the respective through holes 131 of the circuit portion 130 of the bus bar body 100. The coupling protrusions 231 of the housing divided piece 200 are inserted into the respective through holes 121 of the external terminals 120 of the bus bar body 100. The coupling protrusion 241 of the housing divided piece 200 is inserted into the through hole 112 of the input terminal 110 of the bus bar body 100. In this manner, the bus bar body 100 is accommodated in the housing divided piece 200 as illustrated in FIG. 5.

Figure 6:
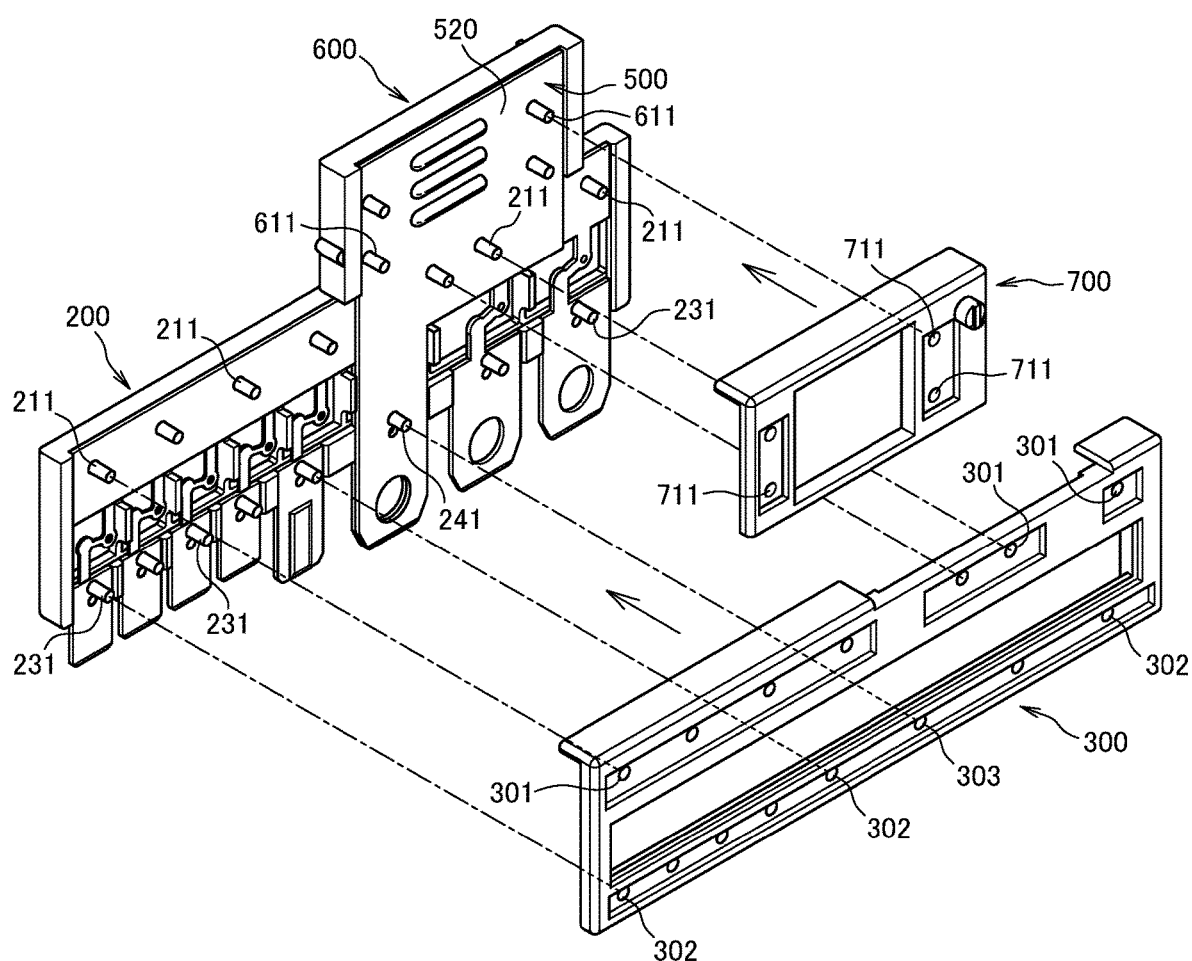
FIG. 6 is an overall perspective view illustrating the process of manufacturing the multi-link fuse in the present invention.

Then, as illustrated in FIGS. 5 and 6, the extension bus bar 500 is accommodated in the housing divided piece 200 and the expansion-housing divided piece 600. Specifically, as illustrated in FIG. 5, the coupling protrusion 241 protruding from the through hole 112 of the input terminal 110 of the bus bar body 100 is caused to pass through the through hole 512 of the input extension terminal 510 of the extension bus bar 500, and the input extension terminal 510 of the extension bus bar 500 is superposed to be in close contact with the input terminal 110 of the bus bar body 100. In addition, the coupling protrusion 211 protruding from the through hole 131 of the circuit portion 130 of the bus bar body 100 is caused to pass through the through hole 524 provided at the lower end 523 of the outer extension portion 520 of the extension bus bar 500, and the lower end 523 of the outer extension portion 520 is superposed to be in close contact with the circuit portion 130 of the bus bar body 100. Further, the outer extension portion 520 of the extension bus bar 500 is accommodated in the accommodation portion 610 of the expansion-housing divided piece 600, and the coupling protrusion 611 of the expansion-housing divided piece 600 is caused to pass through the through hole 522 of the outer extension portion 520.

In this manner, as illustrated in FIG. 6, the extension bus bar 500 is accommodated in the housing divided piece 200 and the expansion-housing divided piece 600. In addition, in a state where the extension bus bar 500 is accommodated, the outer extension portion 520 extends outward and protrudes upward from the bus bar body 100. In addition, the bus bar body 100 and the extension bus bar 500 are integrally fixed by the coupling protrusions (241 and 211) so as not to be separated from each other, but the present invention is not limited thereto. The bus bar body 100 and the extension bus bar 500 may be integrally fixed so as not to be separated from each other by another configuration.

Figure 7:
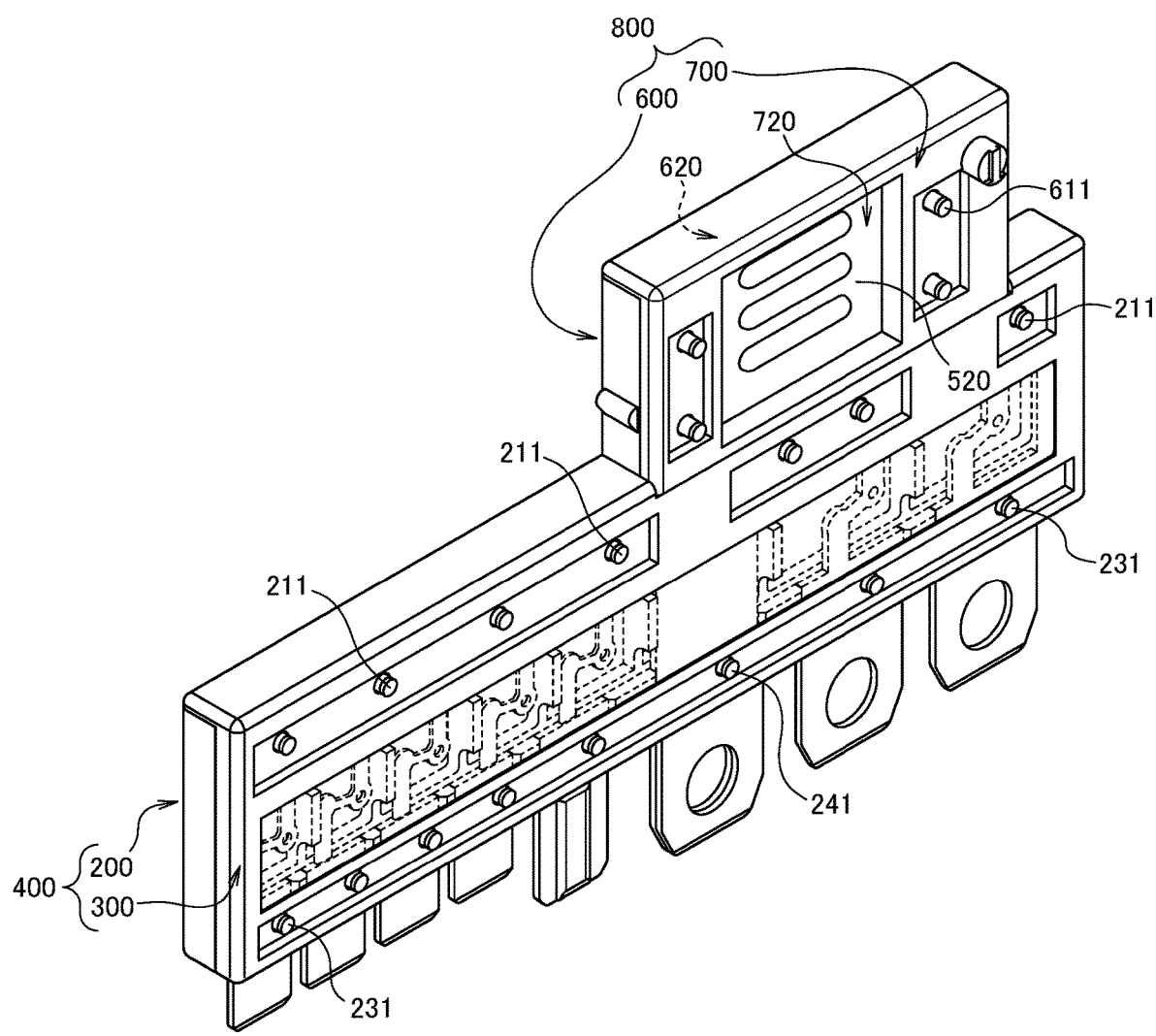
FIG. 7 is an overall perspective view illustrating the process of manufacturing the multi-link fuse in the present invention.

Then, as illustrated in FIGS. 6 and 7, the housing divided piece 300 and the expansion-housing divided piece 700 are assembled. Specifically, as illustrated in FIG. 6, the housing divided piece 300 is attached to the housing divided piece 200 to cover and sandwich the bus bar body 100 accommodated in the housing divided piece 200 and the input extension terminal 510 of the extension bus bar 500. At this time, the coupling protrusions 211 of the housing divided piece 200, that protrude from the bus bar body 100 or the extension bus bar 500, are inserted into the respective insertion holes 301 of the housing divided piece 300. Similarly, the coupling protrusions 231 of the housing divided piece 200, that protrude from the bus bar body 100, are inserted into the respective insertion holes 302 of the housing divided piece 300, and the coupling protrusions 241 are inserted into the respective insertion holes 303 of the housing divided piece 300. In addition, as illustrated in FIG. 6, the expansion-housing divided piece 700 is attached to the expansion-housing divided piece 600 to cover and sandwich the outer extension portion 520 of the extension bus bar 500 accommodated in the expansion-housing divided piece 600. At this time, the coupling protrusions 611 of the expansion-housing divided piece 600, that protrude from the outer extension portion 520, are inserted into the respective insertion holes 711 of the expansion-housing divided piece 700.

In this manner, as illustrated in FIG. 7, the bus bar body 100 is accommodated inside by the housing body 400 configured by the housing divided pieces 200 and 300. In addition, the extension bus bar 500 is accommodated inside by the housing body 400 and the expansion housing 800 configured by the expansion-housing divided pieces 600 and 700. Note that, by locally overheating and welding the tips of the protruding coupling protrusions (611, 211, 231, and 241) to the surroundings, the housing body 400 and the expansion housing 800 are firmly fixed.

Figure 8:
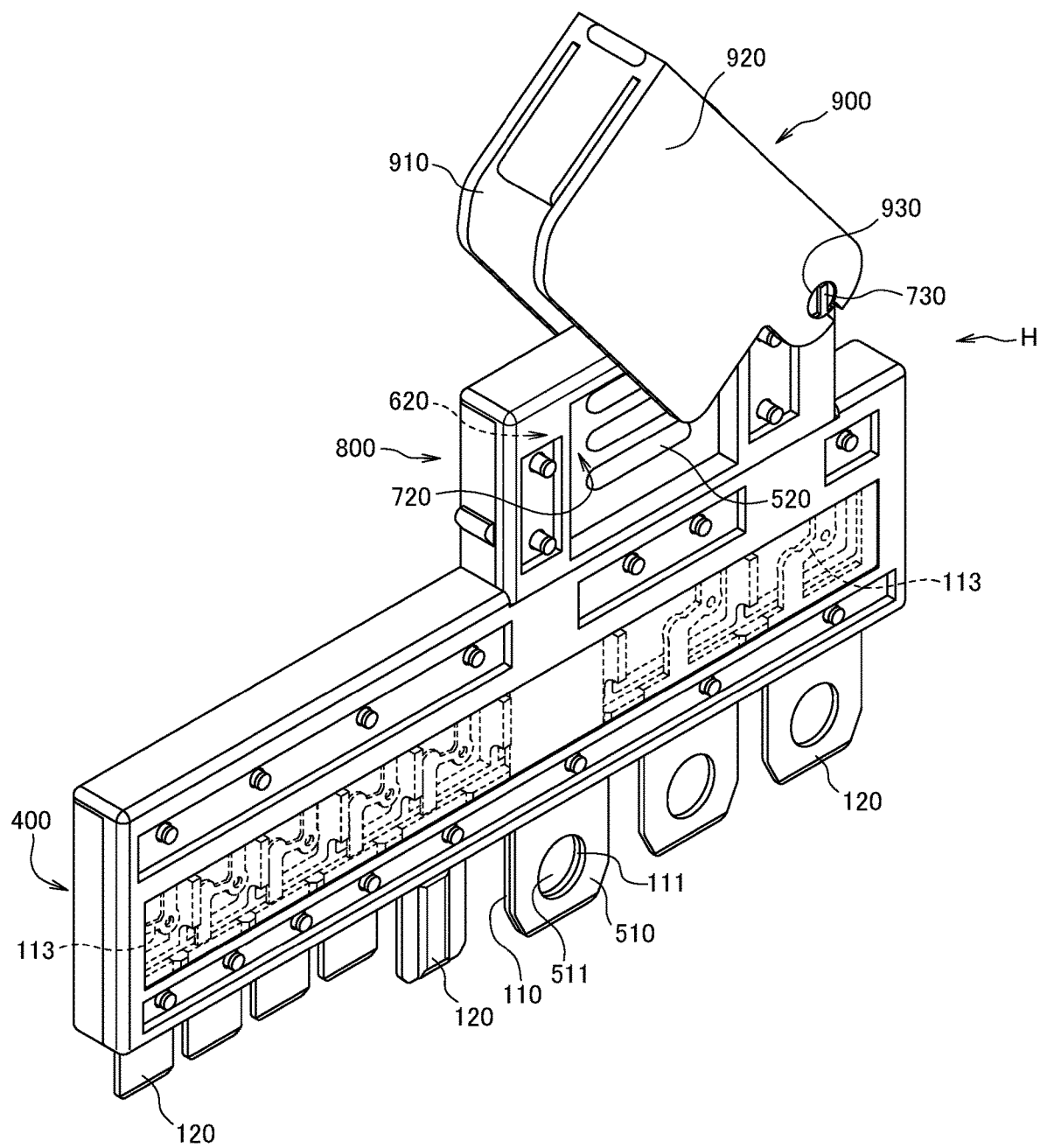
FIG. 8 is an overall perspective view illustrating the process of manufacturing the multi-link fuse in the present invention.

Then, as illustrated in FIG. 8, since the outer extension portion 520 is exposed from the exposure window 620 on the back side and the exposure window 720 on the front side of the expansion housing 800, a cover portion 900 that covers the outer extension portions 520 is attached so as not to carelessly touch the outer extension portions 520. The cover portion 900 is made of synthetic resin and formed in a hollow shape. The cover portion 900 includes two plate-shaped side walls (910 and 920) and a shaft hole 930 coupled to the pivot shaft 730 of the expansion housing 800.

By assembling all the members in this manner, the manufacturing of the multi-link fuse H as illustrated in FIG. 8 is completed. The completed multi-link fuse H is used to protect an electric circuit mounted on an automobile or the like and various electrical components connected to the electric circuit. Specifically, a terminal connected to a power source such as a battery is coupled to the input terminal 110 and the input extension terminal 510 protruding from the lower end of the housing body 400, and various electrical components are connected to the external terminals 120 protruding from the lower end of the housing body 400. Power from the battery connected to the input terminal 110 of the multi-link fuse H is supplied to the various electrical components via the external terminals 120. When an excessive current flows, the fusion portion 113 of the multi-link fuse H fuses to cut off the current, thereby protecting the various electrical components.

In addition, at normal time, the cover portion 900 is pivoted downward around the pivot shaft 730 so that a person or the like does not carelessly touch the outer extension portion 520, and thus the outer extension portion 520 exposed to the outside from the exposure window (620, 720) is covered and hidden by the cover portion 900. On the other hand, in an emergency such as a case where the battery is dead, in order to charge the battery, the cover portion 900 is pivoted upward around the pivot shaft 730 to expose the outer extension portion 520 to the outside. Then, a charging connection terminal (not illustrated) connected to another battery for charging (for example, a battery or the like mounted on another vehicle or the like) is connected to the outer extension portion 520, and thus the battery (the dead battery) connected to the input terminal 110 and the input extension terminal 510 of the multi-link fuse H is charged.

As described above, according to the multi-link fuse H of the present invention, since the outer extension portion 520 of the extension bus bar 500, which connects the charging connection terminal, extends outward from the bus bar body 100, the charging connection terminal can be easily attached to the outer extension portion 520. In addition, since the extension bus bar 500 and the bus bar body 100 are integrally fixed to the housing body 400 so as not to be separated from each other in a state where the input extension terminal 510 of the extension bus bar 500 overlaps the input terminal 110 of the bus bar body 100, electrical connection accuracy between the input terminal 110 and the extension bus bar 500 is high, and the battery is effectively charged.

Further, since the input extension terminal 510 of the extension bus bar 500 is fixed to the housing body 400 in a state of being overlapped with the input terminal 110 of the bus bar body 100, it is possible to continuously assemble the extension bus bar 500 in the same manufacturing line of the multi-link fuse H, and the production efficiency is fair. In particular, since both the bus bar body 100 and the portion of the extension bus bar 500 are integrally fixed by being sandwiched between the housing divided pieces 200 and 300, the electrical connection accuracy between the bus bar body 100 and the extension bus bar 500 is high, and it is possible to continuously assemble the extension bus bar 500 in the same manufacturing line of the multi-link fuse H.

In FIG. 8, since the coupling hole 111 of the input terminal 110 overlaps the coupling hole 511 of the input extension terminal 510, for example, when a bolt-like charging connection terminals are inserted into the coupling hole 111 and the coupling hole 511 and then fastened with nuts, the input terminal 110 and the input extension terminal 510 are firmly in close contact with each other, and the electrical connection accuracy between input terminal 110 and extension bus bar 500 is further enhanced. Note that, in FIG. 8, the input terminal 110 and the input extension terminal 510 have the same shape, and the input terminal 110 and the input extension terminal 510 entirely overlap each other. How-ever, the present invention is not limited thereto. The input terminal 110 and the input extension terminal 510 may have different shapes, and the input terminal 110 and the input extension terminal 510 may be configured to partially overlap each other.

In addition, the outer extension portion 520 of the extension bus bar 500 extending outward from the bus bar body 100 is covered and protected by the expansion housing 800. Further, since the expansion housing 800 includes the exposure window for exposing the portion of the outer extension portion 520, it is possible to easily connect the charging connection terminal to the outer extension portion 520. In addition, since the cover portion 900 that opens and closes the exposure window of the expansion housing 800 is provided, it is possible to protect the outer extension portion 520 from being carelessly touched by a person or the like. Further, since the expansion housing 800 is fixed to the housing body 400, it is possible to continuously assemble the expansion housing 800 in the same manufacturing line of the multi-link fuse H, and the production efficiency is fair.

Note that, as illustrated in FIG. 8, the expansion housing 800 of the multi-link fuse H includes the cover portion 900, but the present invention is not limited thereto. The expansion housing 800 may not include the cover portion 900. Further, the multi-link fuse H includes the expansion housing 800, but the present invention is not limited thereto. The multi-link fuse H may not include the expansion housing 800, and the entirety of the outer extension portion 520 may be exposed to the outside. In addition, the expansion housing 800 of the multi-link fuse H includes the exposure windows 620 and 720 on both the back surface and the front surface, but the present invention is not limited thereto. Any number of exposure windows having any shape can be provided at any places as long as the charging connection terminal can be attached. In addition, the charging connection terminal is not limited to a clip shape, and may have any shape.

Note that, since the portion connecting the charging connection terminal is a portion that may be deteriorated by being exposed to an external environment or may be damaged by being connected to the connection terminal many times, it is necessary to protect the surface by performing plating treatment or the like. Therefore, if the portion that connects the charging connection terminal is directly provided on the bus bar body 100, it is necessary to perform the plating treatment on the entirety of the bus bar body 100, and the manufacturing cost increases accordingly. Thus, by providing the extension bus bar 500 separate from the bus bar body 100, as the portion that connects the charging connection terminal, only the extension bus bar 500 needs to be plated. Thus, the manufacturing cost can be reduced.

In addition, the multi-link fuse and the method for manufacturing the multi-link fuse in the present invention are not limited to the above embodiment, and various modifications and combinations can be made within the scope of the claims and the embodiment, and the modifications and combinations are also included in the scope of the right.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A multi-link fuse comprising:
a bus bar body including an input terminal, a plurality of external terminals, and a fusion portion provided between the input terminal and the external terminal;
a housing body that covers the bus bar body; and
an extension bus bar for charging a battery by connecting a charging connection terminal,
wherein the extension bus bar includes an input extension terminal that overlaps the input terminal and an outer extension portion that extends outward from the bus bar body and connects the charging connection terminal, and both the extension bus bar and the bus bar body are fixed to the housing body in a state where the input extension terminal of the extension bus bar is overlapped with the input terminal, and
wherein the extension bus bar is fixed to the housing body in a state where the input terminal and the input extension terminal are not connected to the battery so as to avoid detachment of the extension bus bar.

2. The multi-link fuse according to claim 1, further comprising:
an expansion housing that covers the outer extension portion of the extension bus bar,
wherein the expansion housing includes an exposure window for exposing a portion of the outer extension portion, and is fixed to the housing body.

3. The multi-link fuse according to claim 2, further comprising:
a cover portion that opens and closes the exposure window of the expansion housing.

4. A method for manufacturing a multi-link fuse including a bus bar body and a housing body, the bus bar body including an input terminal, a plurality of external terminals, and a fusion portion provided between the input terminal and the external terminal, and the housing body covering the bus bar body, wherein
an extension bus bar for charging a battery by connecting a charging connection terminal is provided, and
the method comprises: fixing the extension bus bar to the housing body together with the bus bar body in a state where an input extension terminal is overlapped with the input terminal while an outer extension portion that connects the charging connection terminal protrudes outward from the bus bar body, wherein the extension bus bar is fixed to the housing body in a state where the input terminal and the input extension terminal are not connected to the battery so as to avoid detachment of the extension bus bar.

5. The method for manufacturing a multi-link fuse according to claim 4, further comprising:
fixing an expansion housing to the housing body, the expansion housing covering the outer extension portion of the extension bus bar and including an exposure window for exposing a portion of the outer extension portion.

* * * * *